(12) United States Patent
Sun et al.

(10) Patent No.: US 7,626,342 B2
(45) Date of Patent: Dec. 1, 2009

(54) HIGH EFFICIENCY POWER CONTROLLER FOR SOLID STATE LIGHTING

(76) Inventors: Yi Sun, 40 Rockland Ave., Apt 16, Malden, MA (US) 02148; Zhuo Sun, Jin Sha Jiang Rd.895 No. 55-302, Shanghai (CN) 200062

( * ) Notice: Subject to any disclaimer, the term of this patent is extended or adjusted under 35 U.S.C. 154(b) by 114 days.

(21) Appl. No.: 11/760,998

(22) Filed: Jun. 11, 2007

(65) Prior Publication Data
US 2008/0303456 A1    Dec. 11, 2008

(51) Int. Cl.
*H05B 41/16* (2006.01)
(52) U.S. Cl. .................. 315/247; 315/185 S; 315/224; 315/291; 315/312
(58) Field of Classification Search .................. 315/247, 315/246, 224, 225, 291, 307–311
See application file for complete search history.

(56) References Cited

U.S. PATENT DOCUMENTS

| 5,343,122 A * | 8/1994 | Sugimori et al. ........ 315/209 R |
| 6,181,086 B1 * | 1/2001 | Katyl et al. .................. 315/307 |
| 2008/0224636 A1 * | 9/2008 | Melanson .................... 315/307 |
| 2008/0232141 A1 * | 9/2008 | Artusi et al. ............. 363/21.01 |

* cited by examiner

*Primary Examiner*—Tuyet Vo
(74) *Attorney, Agent, or Firm*—Jie Tan

(57) ABSTRACT

A high efficiency power controller comprising of a driver circuit to convert to direct current (DC) voltage from alternating current (AC) voltage is used for drive solid state lighting (SSL) including light emitting diode (LED) and organic light emitting diode (OLED). The driver circuit is comprises of an AC-DC limited current unit, sensor processor, signal generator, feedback controller and SSL lamp module, which converts the AC supply voltage to a DC voltage by using a negative feedback current and voltage limiting circuit for powering SSL. The invented driver circuit operates at high efficiency with low power consumption. The current and voltage feedback circuit mode from current, voltage, light intensity and thermal temperature for SSL possesses reliable DC power driver without any flash during lighting.

18 Claims, 1 Drawing Sheet

HIGH EFFICIENCY POWER CONTROLLER FOR SOLID STATE LIGHTING

TECHNICAL FIELD

The present invention relates to power controller, particularly to power controller used for Solid State Lighting (SSL), and more particularly to high efficiency power controller for SSL lamp module which may include a Light Emitting Diode (LED) array or an Organic Light Emitting Diode (OLED) panel. Parts of the invention may include an alternating-current (AC) to direct-current (DC) converter, a feedback controller and a sensor processor. This invention can find particular application where the LED array and OLED panel is utilized for general illumination.

BACKGROUND

In comparison with a filament lamp or fluorescent lamp, SSL lamps demonstrate a significant number of advantages, such as low power consumption, long useful lifetime, smaller size, lighter weight, and being environment friendly. The efficiency of the high brightness LED is higher than that of filament lamps or fluorescent lamps, it has great potential that LED lamp for general illumination will spread widely. However, for such wide spread use to become possible a high efficiency and reliable power controller which converts AC to DC for the SSL driver is desirable.

One LED array usually operates with a few volts of direct-current (DC) power supply voltage, and emits a small amount of illumination. In practical lighting application, an array of a series of LED arrays are connected either in series or in parallel or in combination of series and parallel to achieve a desired illumination flux. In such use the usually commercially available alternating-current (AC) power needs to be converted to direct current (DC); a power supply controller, conventionally, a transformer based AC-DC converter and/or a pulse width modulation (PWM) controller is used for this conversion.

A panel of LED arrays for a lighting application requires high power supply to improve the illumination flux. The LED generally operates at high operating current, i.e. 0.35 A for 1 W LED, 1 A for 3 W LED, 1.5 A for 5 W LED, 3 A for 10 W LED. But the high current and increased power voltage can cause additional thermal dissipation which can significantly decrease the lifetime of a LED lamp. Therefore, enhancing the efficiency of the LED driver to reduce power consumption would be a considerable advantage particularly for general illumination applications.

In a conventional AC-DC converter where a transformer and a PWM method are used, the transformer too consumes power; and the high frequency pulses associated with PWM also generate flashes in SSL illumination which may be detrimental for human eyes and can reduce the lifetime of SSL. Moreover, the power consumption by the power controller itself can increase significantly when operating at high current condition thus rapidly decreasing reliability. In addition, the power efficiency of SSL lighting is lowered if the transformer and PWM power controller are used at high current. The transformer and PWM type of AC-DC converter may only have a typical power efficiency of 70-80%.

Another problem associated with commercial AC power, such as the 220V or 110V system, is that the supplied AC voltage is unstable and can vary around ±20% magnitude. This variation can cause the working current of a SSL lamp change exponentially, thus would significantly affect the lighting intensity of the SSL during the operation of the SSL. The greatly increased current of the SSL could result in reduced SSL lifetime or even damage the device. In addition, high current variation could cause high load variable; temperature, light intensity, transistors, diodes, resistors in the driver circuit become unstable during operation, causing the performance of other electronic devices and LEDs/OLEDs degrade dramatically.

Therefore there is a need for highly efficient, stable and reliable power controller in order for LED/OLED lamp to be used for general illumination applications.

SUMMARY

In view of the foregoing and other problems, disadvantages, and drawbacks of the conventional methods and structures, an object of the present invention is to provide a highly efficient and reliable power controller for SSL lamps, which overcomes the above problems.

In one embodiment a high efficiency SSL driver circuit is included which utilizes a capacitor to regulate the SSL driving current, providing high efficiency and low power consumption.

In another embodiment a feedback circuit is included. By sensing the working current, voltage, temperature, or light intensity, it can fine tune the power supply for the operation of the SSL thus maintaining a reliable and stable power supply during the operation of the SSL.

BRIEF DESCRIPTION OF THE DRAWINGS

In the drawings, like reference characters generally refer to the same parts throughout the different views. Also drawings are not necessarily to the scale, emphasis instead generally being placed upon illustrating the principles of the invention.

DETAILED DESCRIPTION

Figure 1:
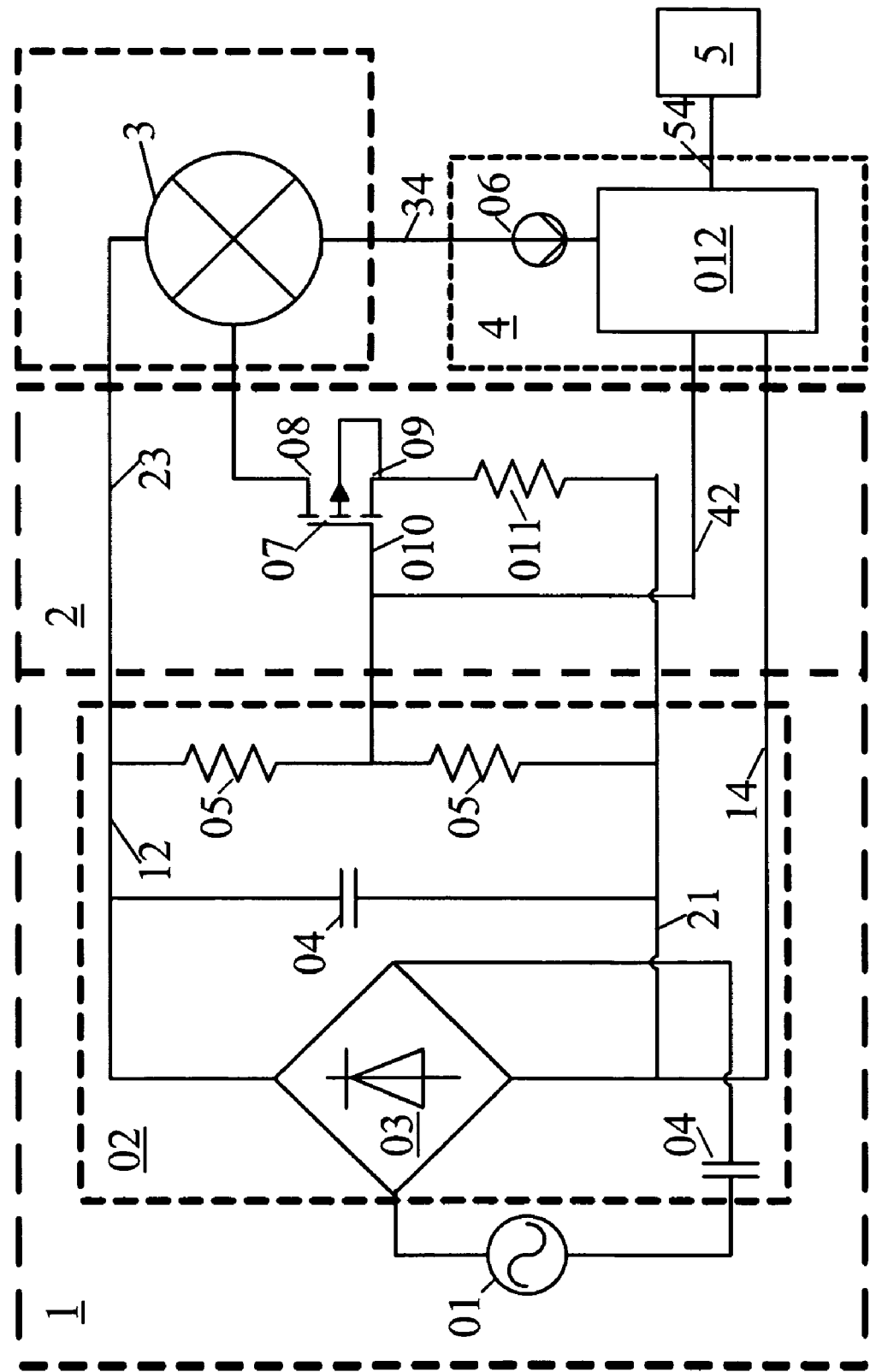
FIG. 1 shows a schematic diagram of the power controller, in accordance with the present invention. 1, AC-DC limited current unit; 2, Feedback controller; 3, SSL lamp module; 4, Sensor processor (multi-signal collector comparator); 5, Standard signal generator; 12, Output DC current; 14, I&V Sample Signal; 21, Feedback Signal; 23, Output DC power (I&V) to the SSL; 34, Bright/thermal signals; 42, Control signal; 54, Standard signal; 01, AC power connecting portion; 02, bridge circuit; 03, rectifying diodes; 04, capacitor; 05, resistor; 06, sensing resistor; 07, field effect transistor which has a drain (current controller) 08, a source 09, and a gate 010; 011, comparator circuit, 012, processor of sensor processor 4.

In the present disclosure, numerous specific details are provided, such as examples of apparatus, components, and methods to provide a thorough understanding of embodiments of the invention. Persons of ordinary skills in the art will recognize, however, the invention can be practiced without one or more the specific details. In other instances, well known details are not shown or described to avoid obscuring aspects of the invention.

Referring to FIG. 1, a power controller in this invention for SSL application may have an AC-DC limited current unit 1; Feedback controller 2; SSL lamp module 3; Sensor processor (multi-signal collector comparator) 4; Standard signal generator 5. In operation, DC current 12, current and voltage sample signal 14, feedback signal 21, output DC power to SSL 23; brightness and/or thermal signals 34; control signal 42; standard signal 54 are generated.

In one preferred embodiment, the AC-DC limited current unit 1 may have an AC power connecting portion 01 for connecting to a power source, and a bridge circuit 02 which is adaptedly connected to portion 01. Bridge circuit 02 converts the AC supply voltage to a DC voltage at DC current 12. The AC power connecting portion 01 may be connected to a commercial AC110V or AC220V power supply. The bridge circuit 02 may further include rectifying diodes 03, a capacitor 04 and a resistor 05 having a first side connected to the bridge circuit 02.

In one preferred embodiment, the SSL lamp module 3 may include LEDs, preferably in arrays, or OLED, preferably in panels.

In one preferred embodiment, the following working loop may be followed: When the AC-DC limited current unit 1 is connected to a power source, it converts an AC supply to DC supply having DC current 12, and transmits DC current 12 to Feedback controller 2 which generates an output DC supply 23 and transmits it to SSL module 3. Simultaneously AC-DC limited current unit 1 transmits a sample signal 14 to sensor processor 4. After DC supply 23 from the feedback controller 2 is sent to SSL lamp module 3, SSL lamp module 3 generates signal 34 according to the brightness and/or thermal signals from SSL lamp module 3 and sends signal 34 to sensor processor 4. On the other hand, standard signal generator 5 which is also connected to feedback controller 2 collects information about SSL module 3 and the output DC power 23, generates a standard signal 54 which varies according to the DC power 23, and transmits signal 54 to sensor processor 4. After receiving and processing all the signals, sensor processor 4 sends a control signal 42 back to the feedback controller 2 and the feedback controller 2 then sends a feedback control signal 21 to the AC-DC limited current unit 1 while adjusting the DC current 23 to the SSL lamp module 3 according to the feedback control signal 21. After receiving feedback control 21, AC-DC limited current unit 1 adjusts its output DC current 12 according the feedback control signal 21.

Meanwhile, sample signal 14 corresponds to the variable output DC voltage and current 12 in the AC-DC limited current unit 1, which varies along with the AC supply. In situations where the commercial AC power such as 220V or 110V is used and the voltage may vary at about ±20%. Feedback signal 21 in responding to the variable voltage and current requests AC-DC limited current unit 1 to compensate the variation and to maintain a stable DC output to the SSL lamp.

In one preferred embodiment the sensor processor 4 may have a multi-signal collector and comparator which may process and compare the working current and voltage signals or the converted by lighting intensity and thermal temperature signals 34 from SSL lamp module 3. The multi-signal collector comparator may comprise a sensing resistor 06 which may be a thermistor, and/or photosensor adaptedly connected to the SSL lamp module 3. Generally when the temperature of the LED of a SSL lamp is above certain level, such as 100° C., the lifetime of the LED will greatly decrease. In this disclosure, a thermistor of the sensing resistor 06 can measure the temperature of the LED and provide a signal to the sensor processor 4 and feedback controller 2 to regulate the current supply 23 to the LED, thereby controls the temperature of LED not to be above a predetermined level. In the meantime a photosensor of the sensing resistor 06 can detect the brightness of the LED lamp. When the lighting intensity has changed in great magnitude, the photosensor will provide a signal to the processor 012 of sensor processor 4 and the corresponding feedback loop circuit to regulate the current supply 23 to the LED, thereby greatly increasing the uniformity and repeatability of LED lamp module during lighting.

In one preferred embodiment, the AC-DC limited current unit 1 may comprise capacitors, inductors and resistors connected to the diode based bridge circuit 02, rectifying the received alternating current for generating a DC power. In this disclosure, this unit can convert AC voltage such as 220V or 110V into 3 to 300V DC voltage, at current from 0.01 to 10 A. Because of the rectifying and feedback mechanism, the power efficiency remains high, generally not less than 90%.

In one preferred embodiment, the feedback controller 2 may comprise a field effect transistor 07 having a drain 08 that is connected to a cathode of the SSL lamp module 3; a source 09 that is connected to the lower voltage terminal of the power supply and a gate 010 that is connected to receive electrical signal 42. A feedback controller 2 may also include a current controller (drain) 08 and comparator circuit 011 for comparing between a reference signal and a feedback signal for sensing and regulating the output load voltage and current 23.

The power controller in this disclosure may be manufactured as one integrated circuit chip that include an AC-DC limited current unit 1, feedback controller 2, sensor processor 4 and signal generator 5 or it may be assembled with separate components. A power controller according to this disclosure may reach power efficiency as much as more than 90% for SSL applications.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A power controller for solid state lighting (SSL), comprising:
    an AC-DC limited current unit for converting an input AC power to a first DC power, wherein a bridge circuit is coupled with a first and a second capacitor in such configuration that when the input AC power is connected, the input AC power is sequentially treated by the first capacitor, the bridge circuit, and the second capacitor
    a feedback controller coupled to the AC-DC limited current unit;
    a sensor processor coupled to the feedback controller;
    a signal generator coupled to the sensor processor; and
    a SSL lamp module coupled to the feedback controller and at least one feedback sensor, said AC-DC limited current unit, said feedback controller and said SSL lamp module being in close loop circuit,
    wherein said signal generator generates a standard signal reflecting the standard settings of the SSL lamp module and the value of the first DC powers and transmits the standard signal to said sensor processor; and said sensor processor, after collecting signals from the at least one feedback sensor which measures the working condition of the SSL lamp module, sends a control signal to said feedback controller; and said feedback controller generates a control signal to said AC-DC limited current unit and simultaneously modifies the first DC power and outputs a second DC power directly to said SSL lamp module.

2. The power controller of claim 1, wherein the SSL lamp module includes at least one of emitting diode (LED), and/or organic light emitting diode (OLED); and wherein the SSL lamp module comprising at least of LED arrays, and/or OLED panel.

3. The power controller of claim 1, wherein the signal generator transmits the current and voltage to the sensor processor according to the SSL lamp module present working power condition.

4. The power controller of claim 1, wherein the AC-DC limited current unit comprising capacitors, inductors and resistors connected to the diode based bridge circuit; rectifying and filtering the received AC for generating a DC power supply to the SSL lamp module.

5. The power controller of claim 1, wherein the AC-DC limited current unit includes a first side for connection to an AC input and a second side for connection directly to the sensor processor and the feedback controller wherein a sample output signal is directly transmitted from the AC-DC limited current unit to the sensor processor for processing.

6. The power controller of claim 1, wherein the variations in the current and voltage can be compensated by the feedback controller to make a stable DC power output to the SSL lamp module.

7. The power controller of claim 1, wherein AC input connection comprises commercial AC in the range of approximately 110±10V to 220±20V power supply; and wherein the DC voltage is in the approximate range of 3-300V.

8. The power controller of claim 1, wherein the feedback controller includes a comparator circuit for comparing between a reference signal and feedback signal, and a field effect transistor having a drain connected to a cathode of the SSL lamp module.

9. The power controller of claim 1, wherein the power controller can be tuned to change the brightness of the SSL lamp module.

10. The power controller of claim 1, wherein the power controller including an AC-DC limited current unit, feedback controller, sensor processor and signal generator are fabricated as one integrated circuit chip.

11. The power controller of claim 1, wherein the power factor is above 0.8, show capacitive type load.

12. The power controller of claim 1, wherein the power efficiency is more than 90% for SSL applications.

13. The power controller of claim 1, wherein the AC-DC limited current unit includes an AC power connecting portion for being connected to a power source, and the bridge circuit is further connected with resistors.

14. The power controller of claim 13, wherein the bridge circuit is further connected with, at least one of a inductor and/or a resistor having a first side connected to the bridge circuit.

15. The power controller of claim 1, wherein the feedback controller collects the signals from the SSL lamp module and the sensor processor, sends an analog control signals to the AC-DC limited current unit and the AC-DC limited current unit adjusts the first DC power in accordance with the control signal.

16. The power controller of claim 15, wherein the feedback controller comprises a field effect transistor having a drain connected to the cathode of the SSL lamp module, a source connected to the lower voltage terminal of the first DC power, and a gate connected to receive an electrical signal.

17. The power controller of claim 1, wherein the feedback sensor directly senses the lighting intensity and the thermal temperature from the SSL lamp module and sends feedback current to the sensor processor; and the sensor processor includes a multi-signal collector comparator to process the feedback current and signals from the signal generator; and to send feedback signals to the AC-DC limited current unit and the feedback controller.

18. The power controller of claim 17, wherein the multi-signal collector comparator comprises a sensing resistor adapted to be connected to the SSL lamp module, and wherein the sensing resistor includes at least one of a thermistor, and/or photosensor and wherein the feedback loop circuit connected to the SSL module includes a current controller and comparator circuit for comparing a references and feedback for sensing and regulating load voltage and current.

* * * * *